April 17, 1956 R. E. JASPERSON 2,741,854
VERTICAL SEEKING APPARATUS
Filed Nov. 24, 1952
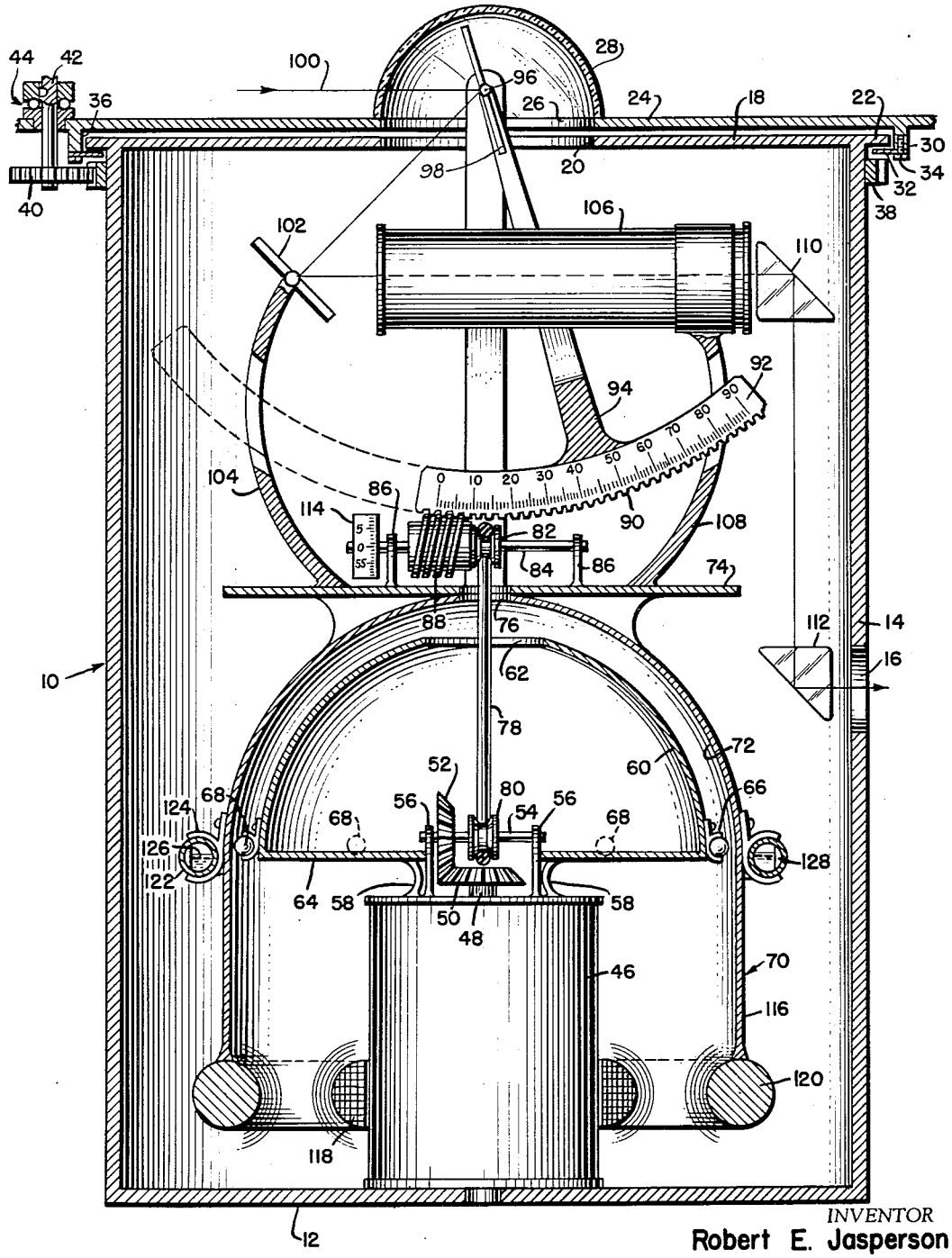
INVENTOR
Robert E. Jasperson
BY Raymond W. Colton
ATTORNEY

United States Patent Office 2,741,854
Patented Apr. 17, 1956

2,741,854

VERTICAL SEEKING APPARATUS

Robert E. Jasperson, Annapolis, Md.

Application November 24, 1952, Serial No. 322,299

1 Claim. (Cl. 33—215)

According to Einstein's "Principle of Equivalence," a gravitational field of force at any point of space is in every way equivalent to an artificial field of force resulting from acceleration, so that no experiment can possibly distinguish between them. The text further sets forth that because of these circumstances, it is inherently impossible to devise any instrument which will show the direction of the vertical in an aeroplane since an acceleration of the aeroplane produces on any instrument whatever, effects which are indistinguishable from those of gravity.

Accepting these facts, it is among the objects of the present invention to provide a vertical seeking apparatus which is primarily responsive to gravitational forces and which is compensated with regard to acceleration forces to a substantial degree.

Among the many applications of the present invention are included sextants for aircraft, surface craft, submarines or terrestrial uses; partially or completely automatic celestial navigation systems; drift instruments, inertial guidance systems; fire control instruments; compasses; cameras; bomb sights; and other applications requiring accuracy as to the true vertical.

This invention is eminently suited for use in a system such as that described in the patent to Jasperson, 2,444,933, dated July 13, 1948, and represents a marked simplification combined with increased accuracy as compared with devices exemplified by the patent to Null, 2,511,869, dated June 20, 1950.

The vertical seeking apparatus contemplated by this invention comprises a support having a spherical supporting surface defining a magnetic pole providing a substantially symmetrical flux pattern, a pendulous vertical seeking element having a spherical surface concentric with that of the spherical supporting surface, of like magnetic polarity, and opposed thereto over a substantial area, the element being sustained in spaced relationship to the support in opposition to gravitational forces solely by magnetic repulsion, and restraining means limiting relative separation of the surfaces. The vertical seeking element is employed to support an instrument such as an optical instrument and for many of the proposed applications, such an instrument will be adjustable in altitude as well as in azimuth, in which cases means are provided for adjusting such an instrument in altitude and/or azimuth. Accordingly, the vertical seeking element preferably includes a platform to be stabilized relative to gravity and such platform may receive the azimuth adjustments required.

Whereas the vertical seeking element may carry various forms of adjusting means, in order to reduce the weight that it must sustain, it is preferable that suitable adjusting means be supported independently of the element and that transmission means interconnecting the adjusting member and instrument be employed. A very satisfactory system has been developed wherein the adjusting means is interconnected with the instrument through the restraining means.

Whereas other arrangements are contemplated, it is preferred that the spherical supporting surface be convex and the concentric spherical surface be concave and that these surfaces be defined by hemispheres at least one of which contains an aperture in the path of a radius normal to its base.

It is highly desirable that the vertical seeking element be provided with acceleration compensating means which may assume the form of an annular tube or toroidal tube which is only partially filled with liquid and which has its axis of revolution perpendicular to the bases of the hemispheres. A baffle is preferably provided within such annular or toroidal tubes to assure rapid stabilization following any displacement of the liquid.

Whereas it is most desirable that the vertical seeking element be substantially free from damping in the vicinity of its coincidence with the vertical, it is proposed that damping means, preferably magnetic daming means, be provided to restore the system should the vertical seeking element depart unduly from the true vertical.

The magnetic repulsion between the spherical surfaces should only slightly exceed the weight of the vertical seeking element and its load. A practical form of the invention includes a substantially cylindrical balancing skirt depending from the spherical portion of the vertical seeking element which cooperates in producing the pendulous effect and which may suitably carry at least a portion of the magnetic damping means.

A more complete understanding of the invention will follow a detailed description of the accompanying drawing depicting an elevation, partially in section, of a device embodying the invention.

A housing 10 is depicted in the drawing as having a base 12, a peripheral wall 14 containing a light window 16, and a top wall 18 containing a central aperture 20 and having a peripheral flange 22. A cover 24 contains a central opening 26 in registry with the opening 20 of the top wall, surmounted by a light transmitting closure 28. The cover 24 is provided with a downwardly directed skirt 30 to which an annular retainer 32 is secured by screws 34 to form a channel 36 for reception of the flange 22. A ring gear 38 secured to the peripheral wall 14 of the housing is engaged by a pinion 40 supported on a shaft 42 which is hung from the cover 24 by means of a suitable bearing 44. It will follow that rotation of the shaft 42 will rotate the housing 10 relative to the cover 24 through the pinion 40 and ring gear 38 to effect a change in azimuth.

A motor housing 46 secured to the base 12 of the housing has a vertical drive shaft 48 projecting therefrom and carrying a bevel gear 50 in mesh with a bevel gear 52, carried by a shaft 54 in bearings provided by suitable brackets 56 projecting upwardly from the motor housing. Additional brackets 58 extending upwardly from the motor housing 46 support a substantially hemispherical head 60 containing a central opening 62 at its uppermost portion. Adjacent the base 64 of this hemispherical supporting head, an annular retainer 66 is secured to support a plurality of balls 68 or other suitable buffer elements.

The entire spherical portion of the head 60 constitutes a magnetic pole of given polarity providing a substantially symmetrical flux pattern, and this condition may be achieved by permanently magnetizing the head or by providing it with suitable windings, not shown, to be energized by a source of current. Inasmuch as it is quite common to substitute electromagnets for permanent magnets, no effort has been made to illustrate the former.

A pendulous vertical seeking element 70 is provided with a concave spherical surface 72 concentric with the spherical surface provided by the head 60 and maintained in spaced relation with respect thereto by magnetic repulsion produced by magnetizing this concentric spherical surface 72 to have a polarity like that of the spherical head. Here again, the concentric spherical surface 72 has been illustrated as being permanently magnetized, but if preferable for any reason, windings can be provided to electrically magnetize the body. This vertical seeking element includes a platform 74 for supporting a suitable instrument whose position is to be relatively stabilized. The instrument may be a simple optical instrument such as a mirror, lens or prism or it may be a light source itself, or as shown in the drawing, a star viewer. The concentric spherical surface 72 of the vertical seeking element 70 also contains a centrally disposed perforation 76 through the uppermost portion thereof to permit a belt 78 to pass therethrough so that its lower end will be driven by a pulley 80 secured to the shaft 54 to drive a pulley 82 secured to a shaft 84 which is supported in bearings provided by brackets 86 extending upwardly from the platform 74.

Also secured to the shaft 84 is a worm 88 engaging the teeth 90 of a calibrated arcuate rack 92 supported by a radial arm 94 which is pivotally movable about an axis 96 and carries at its upper end, a mirror 98 to which light is transmitted through the light transmitting closure 28 from a distant star or other external source. A light ray has been illustrated by reference character 100 as directed on the mirror 98 and reflected therefrom to a mirror 102 adjustably carried by a bracket 104 extending upwardly from the platform 74, and reflected from this second mirror, through a suitable optical tube 106 supported by another bracket 108 upstanding from the platform 74, light from the tube 106 encountering a suitably supported prism 110 and directed downwardly therefrom through another prism 112 which is also suitably supported in a manner not shown, the light passing finally through the aperture 16.

As will be noted from the drawing, in addition to the calibrations in degrees carried by the arcuate rack 92, readings in minutes can be obtained from a calibrated drum 114 secured to the shaft 84.

Depending from the spherical portion of the vertical seeking element 70 there is provided a cylindrical skirt 116, the lower end of which is either permanently magnetized or provided with suitable electromagnets to create a field that will produce repulsion with respect to a field produced by a cooperating permanent or electromagnet 118 depicted as surrounding the motor housing 46. The magnet 120 carried at the lower end of the skirt and its cooperating magnet 118 are so produced that their repulsive effect is practically negligible when the system is stabilized as depicted in the drawing, but become increasingly repulsive as the vertical seeking element departs from such a stabilized position as would be caused by forces of acceleration.

Thus, the pendulous vertical seeking element may be said to be undamped within a cone extending approximately 5° from the vertical axis as shown, yet damping will occur should the deviation greatly exceed that amount and thus assist in the rapid restoration of the stable condition.

In order to provide compensation for such accelerating forces, a toroidal tube 122 having an axis of revolution passing through the center of the spherical surfaces is secured at the base of the hemispherical surface 72 of the vertical seeking element by means of a suitable clip 124. This tube is only partially filled with a liquid 126, such as mercury, and contains one or more baffles 128 to help stabilize the liquid after it has been displaced. By virtue of this acceleration compensating means, when there is a displacement of the vertical seeking element due to acceleration forces, the liquid in the tube 122 will be displaced in a direction tending to restore the vertical seeking element to the position from which it was displaced; or, stated differently it will tend to prevent such displacement by creating a righting torque equal and opposite to the disturbing torque.

Assuming that the apparatus described herein for purposes of example is to be carried by an aeroplane for tracking a particular star, the motor within the casing 46 will be energized to produce rotation at a predetermined rate so as to drive the bevel gears 50 and 52, the pulley 80, the belt 78, the pulley 82, shaft 84, worm 88, rack 92 and mirror 98 and continuously direct the light ray 100 from the distant star or other source through the optical system described. At the same time, a suitably predetermined drive will be imparted to the shaft 42 to rotate the pinion 40 and the housing 10 through the ring gear 38 to maintain the mirror 98 in the necessary position with regard to azimuth to maintain the necessary condition for transmission of the light ray 100. This example is merely one of a large number contemplated by this invention since instruments of many descriptions require similar stabilization as will be provided by this relatively simple and almost frictionless apparatus. The repulsion between the two spherical surfaces is calculated to be slightly in excess of that necessary to sustain the vertical seeking element and its load against the force of gravity, and of course, complete separation of these surfaces is precluded by the belt 78 which serves as a restraining member as well as a force transmitting member.

In view of the fact that only one example has been illustrated and described, despite the many variations that have occurred already to the present inventor, the invention should not be restricted thereto beyond the scope of the appended claim.

I claim:

Vertical seeking apparatus comprising a support having a spherical supporting surface defining a magnetic pole providing a substantially symmetrical flux pattern, a pendulous vertical seeking element having a spherical surface concentric with that of said spherical supporting surface, of like magnetic polarity, and opposed thereto over a substantial area, said element being sustained in spaced relationship to said support in opposition to gravitational forces solely by magnetic repulsion, restraining means limiting relative separation of said surfaces, said vertical seeking element carrying an annular tube only partially filled with liquid for compensating acceleration forces, and a baffle supported within said tube.

References Cited in the file of this patent

UNITED STATES PATENTS

| | | |
|---|---|---|
| 22,598 | Windle | Jan. 11, 1859 |
| 331,604 | Barron | Dec. 1, 1885 |
| 784,511 | Belyeu | Mar. 7, 1905 |
| 925,058 | Wain | June 15, 1909 |
| 2,118,045 | Holton | May 24, 1938 |

FOREIGN PATENTS

| | | |
|---|---|---|
| 24,415 | Great Britain | Nov. 3, 1911 |
| 539,409 | Great Britain | Sept. 9, 1941 |
| 469,547 | Great Britain | July 29, 1937 |